(12) United States Patent
Bruwer

(10) Patent No.: US 6,952,084 B2
(45) Date of Patent: Oct. 4, 2005

(54) INTELLIGENT ELECTRICAL SWITCHING DEVICE

(75) Inventor: Frederick J. Bruwer, Lyttelton (ZA)

(73) Assignee: Azoteq Pty Ltd., Paarl (ZA)

( * ) Notice: Subject to any disclaimer, the term of this patent is extended or adjusted under 35 U.S.C. 154(b) by 0 days.

(21) Appl. No.: 10/690,423

(22) Filed: Oct. 21, 2003

(65) Prior Publication Data

US 2004/0080274 A1 Apr. 29, 2004

Related U.S. Application Data

(63) Continuation of application No. 10/365,042, filed on Feb. 12, 2003, now Pat. No. 6,650,066, which is a continuation of application No. 09/793,303, filed on Feb. 26, 2001, now Pat. No. 6,621,225, which is a continuation of application No. 09/169,395, filed on Oct. 9, 1998, now Pat. No. 6,249,089.

(51) Int. Cl.[7] ............................................. H04B 10/04
(52) U.S. Cl. ................... 315/200 A; 362/184; 362/276
(58) Field of Search .................... 315/200 A, 200 R, 315/84, 86, 291–295, 360, 362; 307/87, 115; 362/184, 205, 276

(56) References Cited

U.S. PATENT DOCUMENTS

| | | | |
|---|---|---|---|
| 2,630,517 A | 3/1953 | Hiscar | 219/266 |
| 2,784,290 A | 3/1957 | Ashton | 219/200 |
| 2,810,797 A | 10/1957 | Gulnick | 200/33 R |
| 3,259,713 A | 7/1966 | Herridge, Jr. et al. | 200/83 T |
| 3,535,282 A | 10/1970 | Mallory | 200/60 |
| 3,646,302 A | 2/1972 | Lehmann | 200/299 |
| 3,721,933 A | 3/1973 | Peroy | 337/66 |
| 3,890,555 A | 6/1975 | Nelson et al. | 320/2 |
| 3,944,804 A | 3/1976 | Wisdom | 362/280 |
| 4,001,803 A | 1/1977 | Lombardo | 340/248 B |
| 4,071,805 A | 1/1978 | Brock | 315/84 |

(Continued)

FOREIGN PATENT DOCUMENTS

| | | | |
|---|---|---|---|
| DE | 41 27 765 A1 | 2/1993 | H05B/39/00 |
| EP | 0 440 897 | 8/1991 | |

(Continued)

OTHER PUBLICATIONS

Schneiker, Henry; "Can You Patent an LED Flashlight?", at the internet at www.hdssystems.com/PatentLEDFlashlight-.pdf, 2 pages. Jan. 2003.

(Continued)

Primary Examiner—Wilson Lee
(74) Attorney, Agent, or Firm—Bruce W. Slayden, II; Baker Botts L.L.P.

(57) ABSTRACT

The present invention, according to a preferred embodiment, is directed to portable electronic devices which operate on exhaustible power sources, for example, batteries. The electronic devices of the present invention comprise at least one signal switch and a microchip in communication with the switch wherein the switch is only capable of transmitting a signal to the microchip that the switch has been activated or deactivated. The microchip is in communication with the exhaustible power source of the electronic device and controls (i) the power on/off function of the device, (ii) at least one other function of the device in response to activation and deactivation signals from the switch, and (iii) an automatic shut off function in response to the receipt of an activation signal from the switch.

56 Claims, 6 Drawing Sheets

U.S. PATENT DOCUMENTS

| | | | |
|---|---|---|---|
| 4,074,252 A | 2/1978 | Keller | 340/321 |
| 4,122,371 A | 10/1978 | Talmage et al. | 315/84 |
| 4,123,668 A | 10/1978 | Pecota | 315/84 |
| 4,228,484 A | 10/1980 | Johnstone | 362/184 |
| 4,237,526 A | 12/1980 | Wood | 362/158 |
| 4,282,681 A | 8/1981 | McCaslin | 446/484 |
| 4,293,894 A | 10/1981 | Blank | 362/100 |
| 4,385,258 A | 5/1983 | Voll | 315/84 |
| 4,403,172 A | 9/1983 | Sasaki et al. | 315/77 |
| 4,408,182 A | 10/1983 | Hashimoto et al. | 340/321 |
| 4,409,645 A | 10/1983 | Sloan | 362/200 |
| 4,414,611 A | 11/1983 | Seltzer et al. | 362/183 |
| 4,442,478 A | 4/1984 | Stansbury | 362/489 |
| 4,473,871 A | 9/1984 | Fuchshuber | 362/276 |
| 4,483,605 A | 11/1984 | Krumrein et al. | 396/159 |
| 4,497,881 A | 2/1985 | Bertolino | 429/91 |
| 4,499,528 A | 2/1985 | Hawlitzki | 362/275 |
| 4,611,264 A | 9/1986 | Bradley | 362/95 |
| 4,623,957 A | 11/1986 | Moore et al. | 362/200 |
| 4,638,174 A | 1/1987 | Bier | 315/10.1 |
| 4,686,609 A | 8/1987 | Dykstra et al. | 362/490 |
| 4,716,902 A | 1/1988 | Swartz | 128/360 |
| 4,739,224 A | 4/1988 | Geerlings | 315/84 |
| 4,807,096 A | 2/1989 | Skogler et al. | 362/142 |
| 4,866,345 A | 9/1989 | Kataoka | 315/84 |
| 4,875,147 A | 10/1989 | Auer | 362/205 |
| 4,876,632 A | 10/1989 | Osterhout et al. | 362/183 |
| 4,908,649 A | 3/1990 | Matsui et al. | 354/403 |
| 4,959,679 A | 9/1990 | Yamamoto et al. | 354/419 |
| 4,963,793 A | 10/1990 | DePauli | 315/74 |
| 5,005,004 A | 4/1991 | Udofot | 340/600 |
| 5,027,037 A | 6/1991 | Wei | 315/200 A |
| 5,047,688 A | 9/1991 | Alten | 315/84 |
| 5,055,268 A | 10/1991 | Martin | 422/84 |
| 5,057,383 A | 10/1991 | Sokira | 429/92 |
| 5,097,284 A | 3/1992 | Taniguchi et al. | 354/415 |
| 5,114,376 A | 5/1992 | Copley et al. | 446/369 |
| 5,130,901 A | 7/1992 | Priesemuth | 362/464 |
| 5,138,538 A | 8/1992 | Sperling | 362/205 |
| 5,174,643 A | 12/1992 | Priesemuth | 362/464 |
| 5,187,655 A | 2/1993 | Post et al. | 700/17 |
| 5,206,097 A | 4/1993 | Burns et al. | 429/90 |
| 5,206,562 A | 4/1993 | Matsuno et al. | 315/77 |
| 5,226,711 A | 7/1993 | Matsuno et al. | 362/488 |
| 5,254,907 A | 10/1993 | Matsuno et al. | 315/77 |
| 5,304,896 A | 4/1994 | Asada et al. | 315/84 |
| 5,309,145 A | 5/1994 | Branch et al. | 340/540 |
| 5,317,362 A | 5/1994 | Takahashi | 354/418 |
| 5,321,309 A | 6/1994 | Kolomyski | 307/10.8 |
| 5,349,540 A | 9/1994 | Birkle et al. | 703/13 |
| 5,357,169 A | 10/1994 | Toyozumi et al. | 315/77 |
| 5,357,408 A | 10/1994 | Lecznar et al. | 362/490 |
| 5,406,171 A | 4/1995 | Moody | 315/77 |
| 5,418,433 A | 5/1995 | Nilssen | 315/175 |
| 5,448,331 A | 9/1995 | Hamada et al. | 354/403 |
| 5,469,346 A | 11/1995 | Haut et al. | 362/205 |
| 5,491,383 A | 2/1996 | Leiber et al. | 315/77 |
| 5,504,415 A | 4/1996 | Podrazhansky et al. | 320/18 |
| 5,526,241 A | 6/1996 | Ferrell | 362/490 |
| 5,583,382 A | 12/1996 | Wagner | 307/10.1 |
| 5,604,407 A | 2/1997 | Andres et al. | 315/77 |
| 5,604,999 A | 2/1997 | Barker | 36/137 |
| 5,611,720 A | 3/1997 | Vandermaas | 446/47 |
| 5,645,341 A | 7/1997 | Liao | 362/183 |
| 5,647,657 A | 7/1997 | Damasky et al. | 362/555 |
| 5,661,393 A | 8/1997 | Sengupta | 320/5 |
| 5,691,619 A | 11/1997 | Vingsbo | 361/86 |
| 5,736,696 A | 4/1998 | Del Rosso | 200/5 R |
| 5,790,961 A | 8/1998 | Ingram et al. | 455/574 |
| 5,806,961 A | 9/1998 | Dalton et al. | 362/183 |
| 5,831,389 A | 11/1998 | Kawashima et al. | 315/77 |
| 5,856,727 A | 1/1999 | Schroeder et al. | 315/55 |
| 5,892,334 A | 4/1999 | Utzman | 315/241 S |
| 5,942,770 A | 8/1999 | Ishinaga et al. | 257/89 |
| 5,969,437 A * | 10/1999 | Foerster | 315/86 |
| 6,000,807 A | 12/1999 | Moreland | 362/95 |
| 6,017,140 A | 1/2000 | Chou | 362/475 |
| 6,030,105 A | 2/2000 | Thau et al. | 362/488 |
| 6,040,660 A | 3/2000 | Schmidt et al. | 315/200 A |
| 6,051,931 A | 4/2000 | Takei | 315/79 |
| 6,079,847 A * | 6/2000 | Nelson | 362/205 |
| 6,095,661 A * | 8/2000 | Lebens et al. | 362/184 |
| 6,129,446 A | 10/2000 | Hornung | 362/394 |
| 6,140,776 A | 10/2000 | Rachwal | 315/200 R |
| 6,152,590 A | 11/2000 | Furst et al. | 362/545 |
| 6,158,872 A * | 12/2000 | Rodgers | 362/276 |
| 6,164,806 A | 12/2000 | Schmickl et al. | 362/547 |
| 6,179,453 B1 | 1/2001 | McMahon | 362/490 |
| 6,239,555 B1 | 5/2001 | Rachwal | 315/200 R |
| 6,259,862 B1 | 7/2001 | Marino et al. | 396/106 |

FOREIGN PATENT DOCUMENTS

| | | | |
|---|---|---|---|
| EP | 0 467 158 | 1/1992 | |
| EP | 0 515 921 | 12/1992 | |
| EP | 0 642 952 | 3/1995 | |
| EP | 0 676 311 | 10/1995 | |
| EP | 0 683 069 | 11/1995 | |
| EP | 0 719 673 | 7/1996 | |
| EP | 0 719 674 | 7/1996 | |
| EP | 0 728 617 | 8/1996 | |
| EP | 0 770 519 | 5/1997 | |
| EP | 0 846 594 | 6/1998 | |
| EP | 0846594 A3 | 6/1998 | B60Q/3/06 |
| EP | 1 025 387 A2 | 8/2000 | F21S/1/00 |
| GB | 2243902 A | 11/1991 | F21L/15/00 |
| GB | 2276713 A | 10/1994 | F21L/7/00 |
| JP | 8062681 | 3/1996 | |
| JP | 10338028 | 12/1998 | |
| JP | 10 338 028 | 12/1998 | B60J/3/04 |
| JP | 11123985 | 5/1999 | |
| JP | 11255017 | 9/1999 | |
| JP | 11321455 | 11/1999 | |
| WO | 97/00790 A1 | 1/1997 | |
| WO | 99/12781 A1 | 3/1999 | |
| WO | 99/20936 A2 | 4/1999 | |
| WO | 99/20936 A3 | 4/1999 | |
| WO | 92/22099 | 12/1999 | H01M/10/48 |

OTHER PUBLICATIONS

Technology Associates, Inc., eternaLight™ product related materials., www.techass.com. pp. 1–3 © 1998, 1999, 2000.

Kochan Consulting Group, Inc., PAL Survival Light product related materials., www.pocketgifts.com/pal.asp. Page 1, © 2002.

Neon–Net Telecom, Neon–Star product related materials., www.neon–net.com.tw/mu.htm. pp. 1–5 and Neon–Star Operation Manu, www.neon–net.com.tw/data4.htm, one page Printed Sep. 15, 2004.

KYTV Springfield, MO, consumer information by Elizabeth Manresa dated Jul. 6, 2000, Light Lives up to Promise, at www.kv3.com/contactdetailed.asp?id=143, p. 1 Printed Jul. 23, 2004.

* cited by examiner

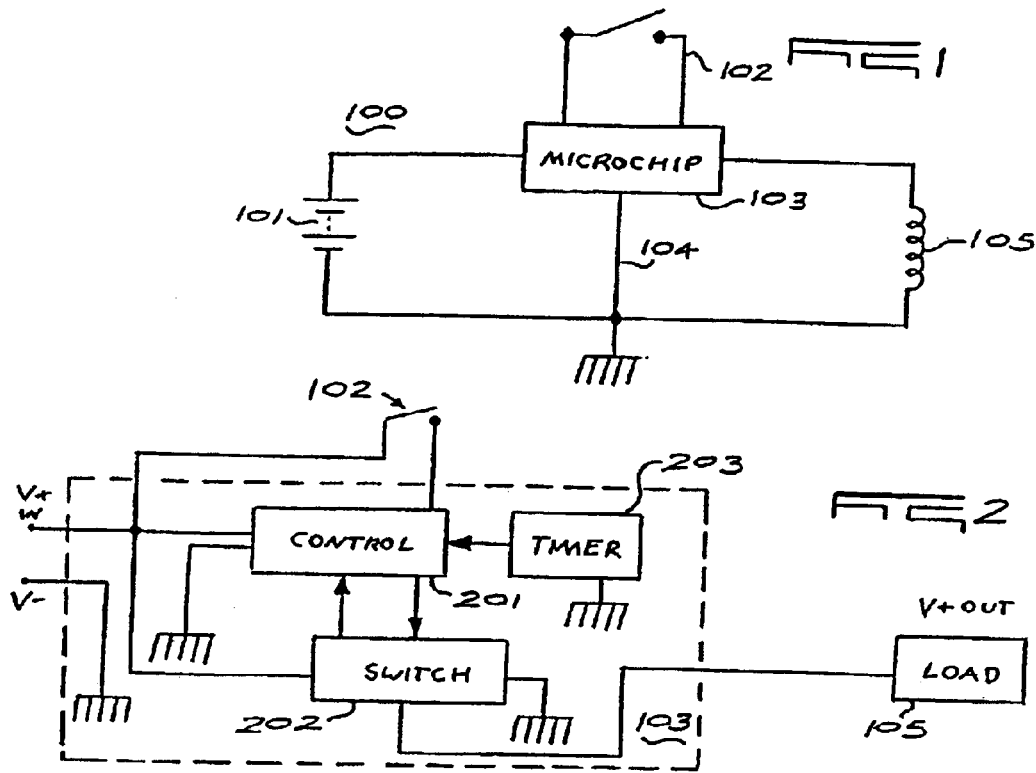
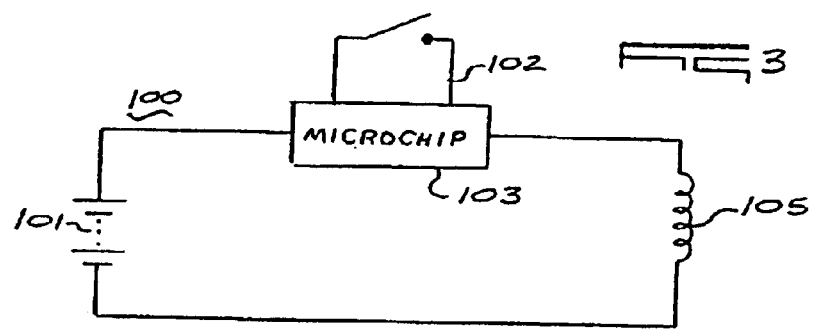

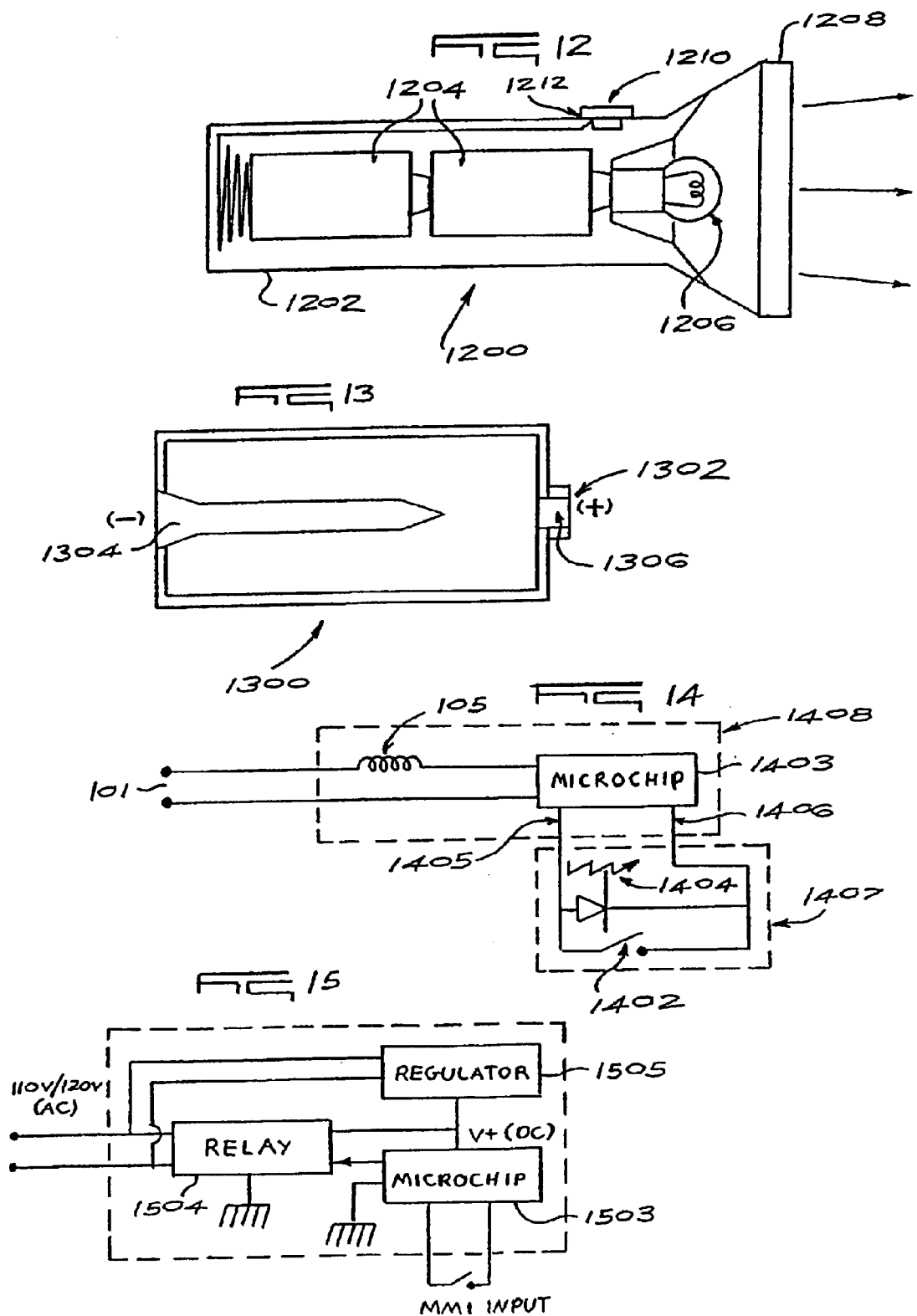

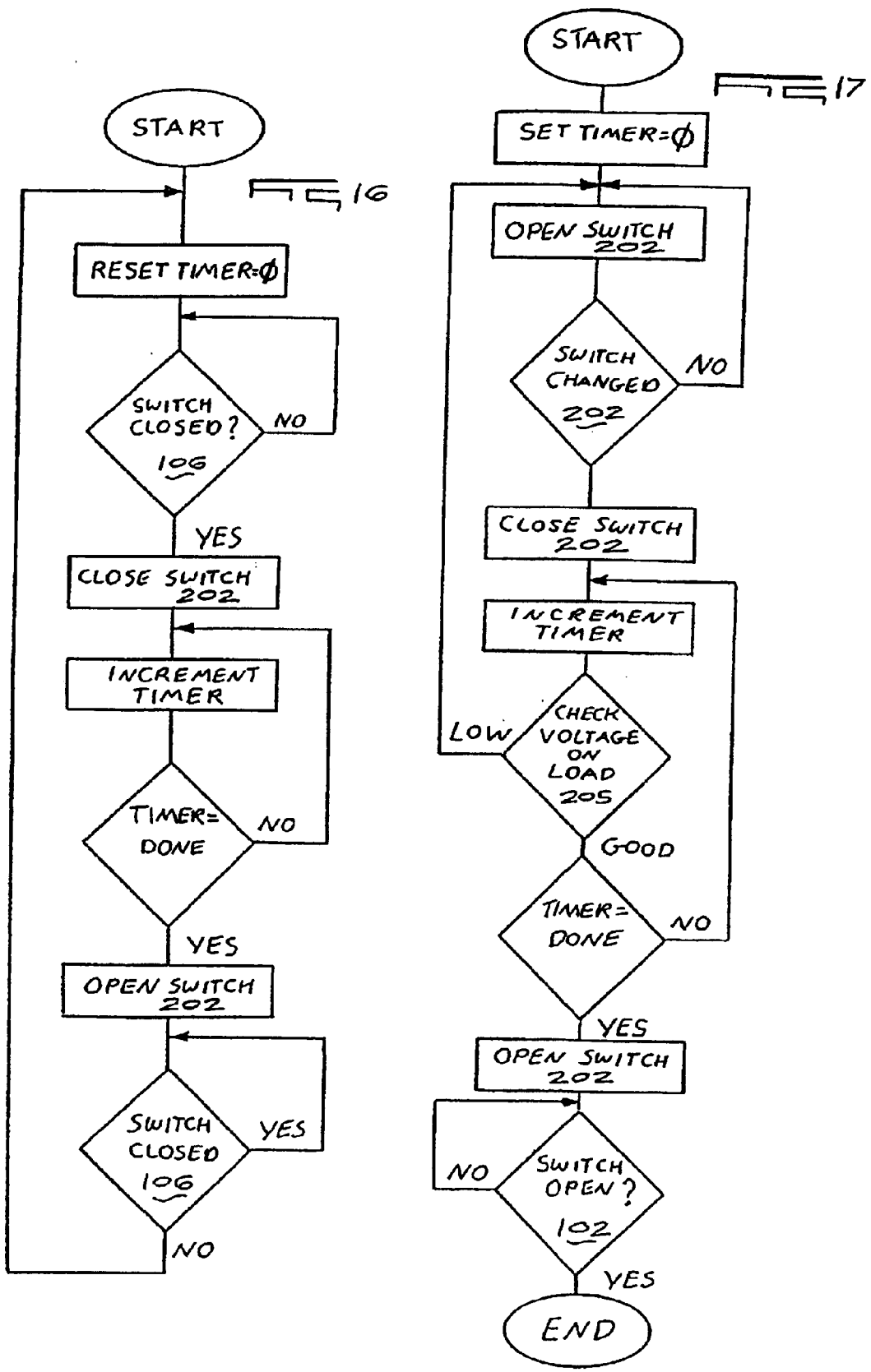

INTELLIGENT ELECTRICAL SWITCHING DEVICE

CROSS REFERENCE TO RELATED APPLICATION

This application is a continuation of U.S. patent application Ser. No. 10/365,042 entitled "Intelligent Electrical Switching Device" filed on Feb. 12, 2003 by Frederick J. Bruwer now U.S. Pat. No. 6,650,066; which is a continuation of U.S. patent application Ser. No. 09/793,303 entitled "Intelligent Electrical Switching Device" filed on Feb. 26, 2001 by Frederick J. Bruwer, now U.S. Pat. No. 6,621,225 B2; which is a continuation of application Ser. No. 09/169,395 entitled "Intelligent Electrical Switching Device Comprising Microchip" filed on Oct. 9, 1998 by Frederick J. Bruwer, now U.S. Pat. No. 6,249,089 B1.

FIELD OF THE INVENTION

The present invention relates to new intelligent electrical current switching devices and more particularly, to microchip controlled electrical current switching devices. The invention further relates, in one embodiment, to intelligent batteries having embedded therein a microchip for use with a variety of electrical devices to add heretofore unknown functionality to existing electrical devices. The invention also relates, according to another embodiment, to intelligent hand-held electronic devices, and in a preferred embodiment to hand-held light sources, and more particularly, to flashlights. According to one embodiment of the present invention, the invention relates to intelligent hand-held flashlights having microchip controlled switches wherein said switches can be programmed to perform a variety of functions including, for example, turning the flashlight off after a pre-determined time interval, blinking, or dimming, etc. According to a still further embodiment, the invention relates to low current switches controlled by microchips of the present invention for use in building lighting systems.

BACKGROUND OF THE INVENTION

In conventional flashlights, manually-operated mechanical switches function to turn the flashlight "on" and "off." When turned "on," battery power is applied through the closed switch to a light bulb, the amount of power then consumed depends on how long the switch is closed. In the typical flashlight, the effective life of the battery is only a few hours at most. Should the operator, after using the flashlight to find his/her way in the dark or for any other purpose, then fail to turn it off, the batteries will, in a very short time, become exhausted. Should the flashlight be left in a turned-on and exhausted condition for a prolonged period, the batteries may then leak and exude corrosive electrolyte that is damaging to the contact which engages the battery terminal as well as the casing of the flashlight.

When the flashlight is designed for use by a young child the likelihood is greater that the flashlight will be mishandled, because a young child is prone to be careless and forgets to turn the flashlight "off" after it has served its purpose. Because of this, a flashlight may be left "on" for days, if not weeks, and as a result of internal corrosion may no longer be in working order when the exhausted batteries are replaced.

Flashlights designed for young children are sometimes in a lantern format, with a casing made of strong plastic material that is virtually unbreakable, the light bulb being mounted within a reflector at the front end of the casing and being covered by a lens from which a light beam is projected. A U-shaped handle is attached to the upper end of the casing, with mechanical on-off slide switch being mounted on the handle, so that a child grasping the handle can readily manipulate the slide actuator with his/her thumb.

With a switch of this type on top of a flashlight handle, when the slide actuator is pushed forward by the thumb, the switch "mechanically" closes the circuit and the flashlight is turned "on" and remains "on" until the slide actuator is pulled back to the "off" position and the circuit is opened. It is this type of switch in the hands of a child that is most likely to be inadvertently left "on."

To avoid this problem, many flashlights include, in addition to a slide switch, a push button switch which keeps the flashlight turned on only when finger pressure is applied to the push button. It is difficult for a young child who wishes, say to illuminate a dark corner in the basement of his home for about 30 seconds, to keep a push button depressed for this period. It is therefore more likely that the child will actuate the slide switch to its permanently-on position, for this requires only a monetary finger motion.

It is known to provide a flashlight with a delayed action switch which automatically turns off after a pre-determined interval. The Mallory U.S. Pat. No. 3,535,282 discloses a flashlight that is automatically turned off by a delayed action mechanical switch assembly that includes a compression spring housed in a bellows having a leaky valve, so that when a switch is turned on manually, this action serves to mechanically compress the bellows which after a pre-determined interval acts to turn off the switch.

A similar delayed action is obtained in a flashlight for children marketed by Playskool Company, this delayed action being realized by a resistance-capacitance timing network which applies a bias to a solid-state transistor switch after 30 seconds or so to cut off the transistor and shut off the flashlight. Also included in the prior art, is a flashlight previously sold by Fisher-Price using an electronic timing circuit to simply turn off the flashlight after about 20 minutes.

It is also known, e.g. as disclosed in U.S. Pat. No. 4,875,147, to provide a mechanical switch assembly for a flashlight which includes a suction cup as a delayed action element whereby the flashlight, when momentarily actuated by an operator, functions to connect a battery power supply to a light bulb, and which maintains this connection for a pre-determined interval determined by the memory characteristics of the suction cup, after which the connection is automatically broken.

U.S. Pat. No. 5,138,538 discloses a flashlight having the usual components of a battery, and on-off mechanical switch, a bulb, and a hand-held housing, to which there is added a timing means and a circuit-breaking means responsive to the timing means for cutting off the flow of current to the bulb, which further has a by-pass means, preferably child-proof, to direct electric current to the light bulb regardless of the state of the timing means. The patent also provides for the operation of the device may be further enhanced by making the by-pass means a mechanical switch connected so as to leave it in series with the mechanical on-off switch. Furthermore, the patent discloses a lock or other "child-proofing" mechanism may be provided to ensure that the by-pass is disabled when the flashlight is switched off.

Most conventional flashlights, like those described above, are actuated by mechanical push or slide button-type switches requiring, of course, mechanical implementation by an operator. Over time, the switch suffers "wear and tear" which impairs operation of the flashlight as a result of, for example, repeated activations by the operator and/or due to the fact that the switch has been left "on" for a prolonged period of time. In addition, such mechanical switches are vulnerable to the effects of corrosion and oxidation and can cause said switches to deteriorate and to become non-functioning. In addition, these prior art devices having these mechanical switches are generally "dumb," i.e. they do not provide the user with convenient, reliable, and affordable functionalities which today's consumers now demand and expect.

The prior art switches typically provide two basic functions in prior art flashlights. First, the mechanical switches act as actual conductors for completing power circuits and providing current during operation of the devices. Depending upon the type of bulb and wiring employed, the intensity of electrical current which must be conducted by the switch is generally quite high leading to, after prolonged use, failure. Second, these mechanical switches must function as an interface between the device and its operator, i.e. the man-machine-interface ("MMI") and necessarily requires repeated mechanical activations of the switch which over time mechanically deteriorate.

Also, currently the electrical switches used in buildings/houses for control of lighting systems are of the conventional type of switches which must conduct, i.e. close the circuit, upon command, thus also providing the MMI. These prior art switches suffer from the same disadvantages as the switches described above in relation to portable electronic devices, like flashlights. Moreover, the switches are relatively dumb in most cases and do not provide the user with a variety of functions, e.g. but not limited to timing means to enable a user, for example, a shop owner or home owner to designate a predetermined shut off or turn on point in time.

There is a need for inexpensive, reliable, and simple intelligent electronic devices which provide increased functionality and energy conservation.

SUMMARY OF THE INVENTION

According to one embodiment of the present invention, there is provided a microchip controlled switch to manage both the current conducting functions and the MMI functions in an electronic device, such as a flashlight, on a low current basis i.e. without the MMI device having to conduct or switch high current. According to one aspect of the invention, the MMI functions are controlled by very low current signals, using touch pads, or carbon coated membrane type switches. These low current signal switches of the present invention can be smaller, more reliable, less costly, easier to seal and less vulnerable to the effects of corrosion and oxidation. Moreover, since the switch is a solid state component, it is, according to the present invention, possible to control the functions of the device in an intelligent manner by the same microchip which provides the MMI functions. Thus, by practicing the teachings of the present invention, more reliable, intelligent, and efficient electrical devices can be obtained which are cheaper and easier to manufacture than prior art devices.

According to another embodiment of the invention, there is provided a microchip which can be embedded in a battery that will lend intelligence to the battery and thus, the device it is inserted into, so that many functions, including but not limited to, delayed switching, dimming, automatic shut off, and intermittent activation may be inexpensively realized in an existing (nonintelligent) product, for example a prior art flashlight.

According to a further embodiment, the invention provides a power saving microchip which, when operatively associated with an electronic device, will adjust the average electric current through a current switch, provide an on and off sequence which, for example, but not limited to, in the case of a flashlight, can be determined by an operator and may represent either a flash code sequence or a simple on/off oscillation, provide an indication of battery strength, and/or provide a gradual oscillating current flow to lengthen the life of the operating switch and the power source.

According to one embodiment of the invention, an intelligent flashlight, having a microchip controlled switch is provided comprising a microchip for controlling the on/off function and at least one other function of the flashlight. According to a further embodiment of the invention, an intelligent flashlight having a microchip controlled switch is provided comprising an input means for sending activating/deactivating signals to the microchip, and a microchip for controlling the on/off function and at least one other function of the flashlight. According to a further embodiment of the invention, there is provided an intelligent flashlight having a microchip controlled switch comprising an input means for selecting one function of the flashlight, a microchip for controlling at least the on/off function and one other function of the flashlight, wherein the microchip control circuit may further comprise a control-reset means, a clock means, a current switch, and/or any one or combination of the same.

According to another embodiment of the invention, there is provided a battery for use with an electrical device comprising a microchip embedded in the battery. According to still a further embodiment of the invention, a battery for use with an electronic device is provided comprising a microchip embedded in the battery wherein said microchip is adapted such that an input means external to the microchip can select the on/off function and at least one other function of the electronic device.

According to one embodiment of the present invention, there is provided an intelligent battery for use with an electronic device, the battery having positive and negative terminal ends and comprising a microchip embedded in the battery, preferably in the positive terminal end, for controlling on/off functions and at least one other function of the electronic device.

According to another embodiment of the invention, there is provided a portable microchip device for use in serial connection with a power source, e.g. an exhaustible power source, and an electronic device powered by said source wherein said electronic device has an input means for activating and deactivating said power source, and said microchip comprising a means for controlling the on/off function and at least one other function of the electronic device upon receipt of a signal from said input means through said power source.

According to a still further embodiment of the invention, there is provided a microchip adapted to control lighting in buildings. According to this embodiment, the normal switch on the wall that currently functions as both a power-switch, i.e. conduction of electricity, and MMI can be eliminated, thus eliminating the normal high voltage and high current dangerous wiring to the switch and from the switch to the load or light. Utilizing the present invention, these switches can be replaced with connecting means suitable for low current DC requirements.

According to another embodiment, the present invention is directed to a battery comprising an energy storage section, a processor, e.g. a microchip and first and second terminal ends. The first terminal end being connected to the energy storage section, the second terminal end being connected to the processor, and the processor being connected to the second terminal end and the energy storage section. The processor controls the connection of the second terminal end to the energy storage section.

According to another embodiment, the present invention provides an electronic apparatus which includes an electrical device, comprising a power supply, an activating/deactivating means, and a processor. The activating/deactivating means is connected to the processor and the processor is connected to the power supply. The processor controls the on/off function of the device and at least one other function of the device in response to signals received from the activation/deactivation means.

The present invention, according to a still further embodiment, provides a flashlight comprising a light source, an energy storage means, a switch means, and a processor means. The switch means being in communication with the processor means and the processor means being in communication with the energy storage means which is ultimately in communication with the light source. The processor controls the activation/deactivation of the light source and, in some embodiments, further functions of the flashlight, in response to signals received from the switch means.

While the present invention is primarily described in this application with respect to either a flashlight or a battery therefore, the embodiments discussed herein should not be considered limitative of the invention, and many other variations of the use of the intelligent devices of the present invention will be obvious to one of ordinary skill in the art.

BRIEF DESCRIPTION OF THE DRAWINGS

FIG. 1 is a schematic of a device having a microchip controlled push button or sliding type input activation/deactivation switch according to one embodiment of the present invention;

FIG. 2 is a block diagram of a microchip for use in association with a push button or sliding input activation/deactivation switch according to one embodiment of the invention;

FIG. 3 is a schematic of a second type of intelligent device having a microchip controlled push button or sliding type input activation/deactivation switch according to another embodiment of the invention;

FIG. 12 is a schematic of a flashlight having therein a microchip controlled switch according to one embodiment of the present invention;

FIG. 13 illustrates a possible position, according to one embodiment of the present invention of a microchip in a battery;

FIG. 14 is a schematic of one embodiment of the present invention of a low current switching device suitable for lighting systems in buildings;

FIG. 15 is a block diagram of one embodiment of the present invention, i.e. microchip 1403 of FIG. 14;

FIG. 16 is a flow diagram for a microchip as shown in FIGS. 4 and 5 for a delayed shut off function embodiment of one embodiment of the present invention; and FIG. 17 is a flow diagram for a microchip as shown in FIGS. 7 and 8a for a delayed shut off function embodiment of one embodiment of the present invention.

DETAILED DESCRIPTION OF THE INVENTION

Figure 4:
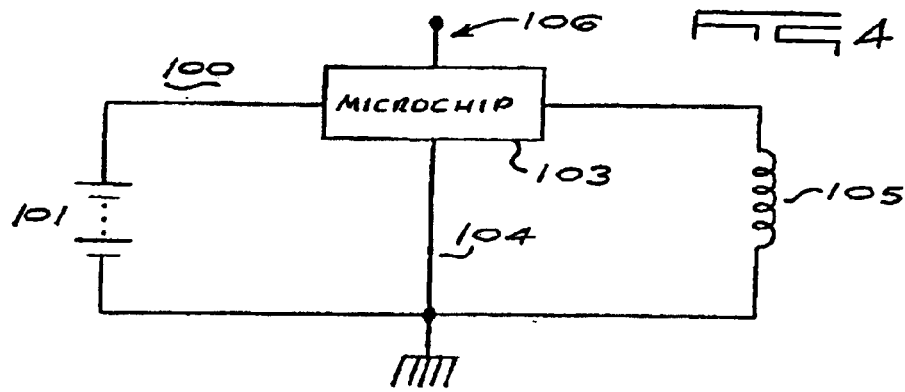
FIG. 4 is a schematic of a device having a microchip controlled touch pad or carbon coated membrane activation/deactivation switch according to a still further embodiment of the invention.

According to one embodiment or aspect of the present invention, and referring to FIG. 1, a schematic depiction of main circuit 100 of an electronic device, for example, a flashlight, is provided, wherein the device has a microchip 103 and a microchip controlled input activator/deactivator 102, for example, a push button or sliding switch. Main circuit 100 of the device is powered by a current supplied by power source 101. Power source 101 may be any power source, e.g. a DC battery, as is well known to those of ordinary skill in the art. While the following discussion is limited to specific electronic devices, that is flashlights, it is to be understood that the following description is equally applicable to other electronic devices including portable radios, toys, for example but not limited to battery operated cars, boats, planes, and/or other electrically powered toys.

Referring to FIG. 1, when an operator activates input push button or sliding command switch 102 to the "on" position, the microchip 103 receives a signal. Switch 102 is a direct electrical input to microchip 103. Microchip 103 is grounded by grounding means 104. Microchip 103 is in series between power source 101 and load 105. Microchip 103 also transfers sufficient power through means of a current switch (not shown in FIG. 1) to load 105 which can be, for example, a resistor-type bulb in the case of a flashlight to provide illumination.

The microchip 103, and other microchips of the present invention, can have its/their intelligence embedded in combinational or sequential logic, a PLA or ROM type structure feeding into a state machine or a true microcontroller type structure. The memory for the above will normally be non-volatile, but should there be a need for selectable options, EE or flash memory structures may be used.

The structure and operational parameters of such a microchip 103 are explained in greater detail below with respect to FIG. 2. As shown in FIG. 1, power is supplied to microchip 103 by power source 101. When an operator activates input switch 102 to the "on" position it represents a command which is communicated to microchip 103. Input means 102 requires very low current in preferred embodiments. In one embodiment of the invention, microchip control/reset means 201 simply allows the current switch 202 to pass current provided from power source 101 to load 105 in an unimpeded manner when the MMI switch 102 is activated, and, in the case of a flashlight, illumination is obtained. It is important to recognize, however, that it is control circuit 201 which activates current switch 202 upon acting on an input from MMI switch 102. Unlike heretofore known prior art devices, activating switch 102 does not conduct current to load 105, but is only a command input mechanism which can, according to the invention, operate on very low current. For example, according to the invention, touch sensor input or carbon coated membrane type switch devices are preferred.

If, for example, an emergency notification function is desired, the flashlight may be designed to alternately flash on and off every second. First, the operator activates input 102 into the appropriate position to indicate such a function is desired. During the "on" segment of the flashing routine, control/reset means 201 commands current switch 202 to close and let current flow through to load 105, thereby causing, in the case of a flashlight, the bulb to illuminate. Simultaneously, control/reset means 201 uses the timing means 203 as a clock for timing. After control/reset means 201 determines one second has elapsed, control/reset means 201 instructs current switch 202 to open and interrupt the current flow through to load 105, and bulb illumination is discontinued. It is important to note that both control/reset means 201 and current switch 202 are still active and fully powered; however, current delivery is now latent with respect to load 105. When another second has elapsed, a command is passed from control/reset means 201 which again allows current to be delivered through current switch 202 to load 105, and in the case of a flashlight, bulb illumination is immediately resumed. The device continues an alternating current delivery routine until either the operator switches the setting of the activating input switch 102 to the "off" position, or until the conditions pre-programmed into the microchip, e.g. into the control/reset means 201, are satisfied and current delivery is permanently discontinued.

Similar operating routines can be employed to generate other conspicuous flashing functions such as the generation of the universal distress signal S.O.S. in Morse code. Again, such a function would require that the microchip, e.g. control/reset means 201, be pre-programmed with the appropriate code for creating such a signal, and to permit current transmission from switch 202 to load 105 in accordance with the code with the assistance of timing means 203. For example, it may be desirable to have an S.O.S. sequence wherein flashes representing each individual letter are separated by time intervals ranging from one-half (½) second to one (1) full second, while the interval between each letter in the code comprises two (2) full seconds. After a certain number of repetitions of the routine, again determined by the operator or as pre-programmed within the microchip, e.g. within the control/reset means 201, the signal is discontinued.

As shown in FIG. 3, it is possible to remove grounding means 104 from main circuit 100. However, it is then necessary to intermittently provide an alternative power source for microchip 103 and to create a virtual ground reference level. A suitable microchip 103 for this configuration is described in greater detail below with respect to FIGS. 8A and 8B.

Referring now to FIG. 4, utilizing the circuits in the microchip of some embodiments of the present invention, carbon coated membrane or touch pad type switches are preferred. Carbon coated membrane switches and touch pad switches have many advantages over conventional high current switches, such as those currently used in flashlights. According to the present invention, carbon coated membrane type switches, low current type switches, and touch pad type switches can be used which may be smaller, less costly, easier to seal, and less vulnerable to corrosion and oxidation than conventional switches which also transfer energy or current to the load. Moreover, according to one embodiment of the present invention, carbon coated membrane type switches, touch pad switches, or low current type switches can be formed structurally integral with the product, for example, with the casing of a flashlight.

Figure 5:
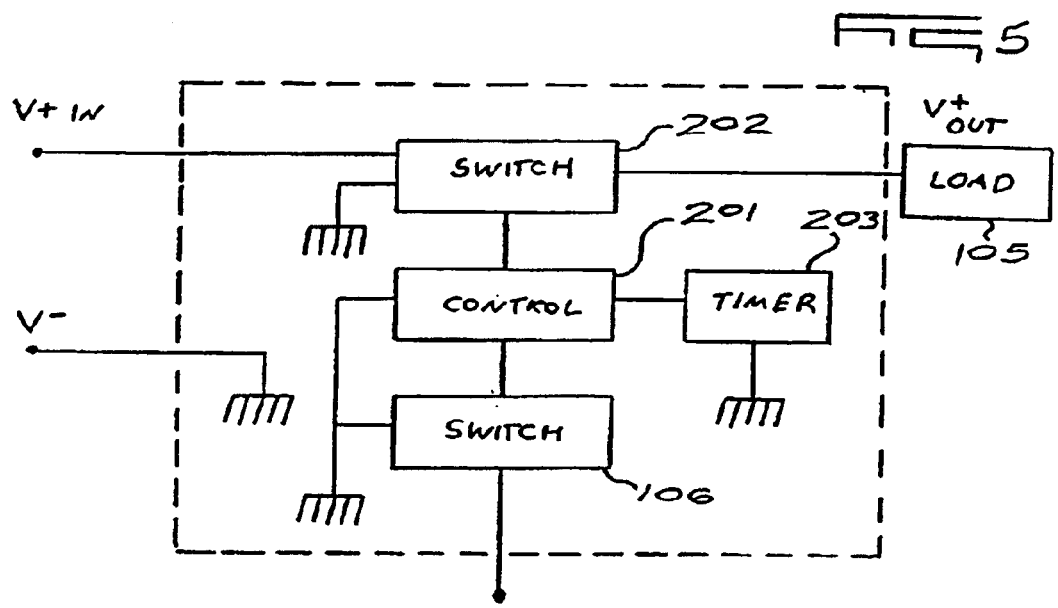
FIG. 5 is a block diagram of a microchip for use in association with a touch pad or carbon coated membrane activation/deactivation switch according to one embodiment of the invention.

A block diagram showing microchip 103 for use, in accordance with one embodiment of the present invention, in association with a carbon coated membrane, a touch pad switch, or a low current type switch 106 is now explained in greater detail in respect to FIG. 5. According to this one embodiment of the present invention, current switch 202 is powered directly by grounded power source 101. However, output of current from current switch 202 to load 105 is dependent on control/reset means 201. When an operator depresses touch pad 106, carbon coated membrane switch 106 or low current type switch 106, control/reset means 201 allows current switch 202 to flow current through to load 105. However, in more intelligent applications according to certain embodiments of the present invention, control/reset means 201 will coordinate, based on clock and/or timing means 203, to execute timing routines similar to those described above such as, but not limited to, intermittent flashing, the flashing of a conspicuous pattern such as Morse code, dimming functions, battery maintenance, battery strength/level, etc.

Figure 6:
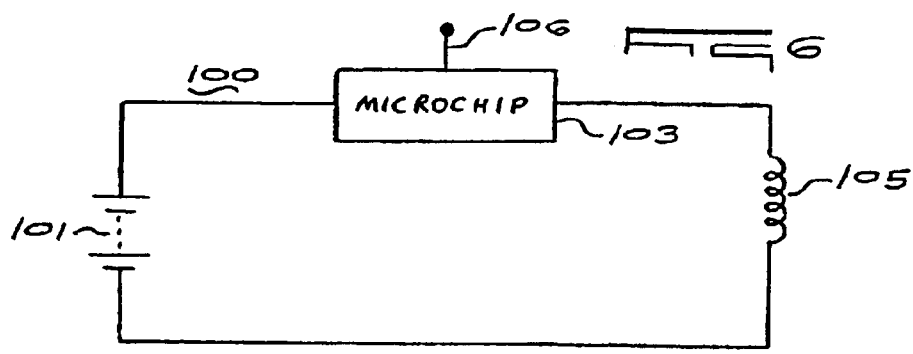
FIG. 6 is a schematic of a second type of device having a microchip controlled touch pad or carbon coated membrane activation/deactivation switch according to one embodiment of the invention.

As shown in FIG. 6, grounding means 104 can be removed from the system as a matter of design choice. A more detailed description of a suitable microchip 103 for this type of configuration is provided below with respect to FIGS. 8A and 8B.

Figure 7:
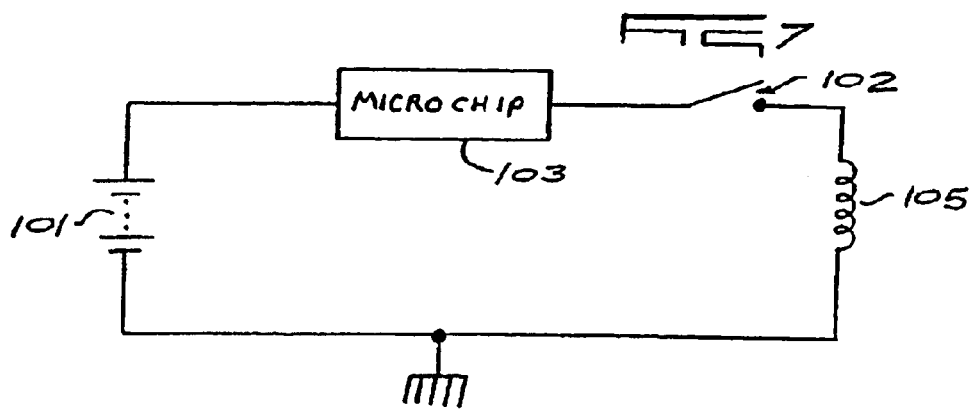
FIG. 7 is a schematic of a battery having embedded therein a microchip according to a further embodiment of the invention.

Referring to FIG. 7, certain embodiments of the present invention also provide for a battery having a microchip embedded for use in association with an electronic device. As shown, direct current is provided to microchip 103 by power source 101. When activating input switch 102 is closed, current is complete and power is transferred to load 105 at the direction of microchip 103. Microchip 103 embedded in the battery can have any number of intelligent functions pre-programmed therein, such as, for example but not limited to, battery strength monitoring, recharging, adjustment of average current through a current switch, intermittent power delivery sequences, and so on. Examples of suitable microchips 103 for this type of application are discussed below with reference to FIGS. 8A and 8B.

Figure 8A:
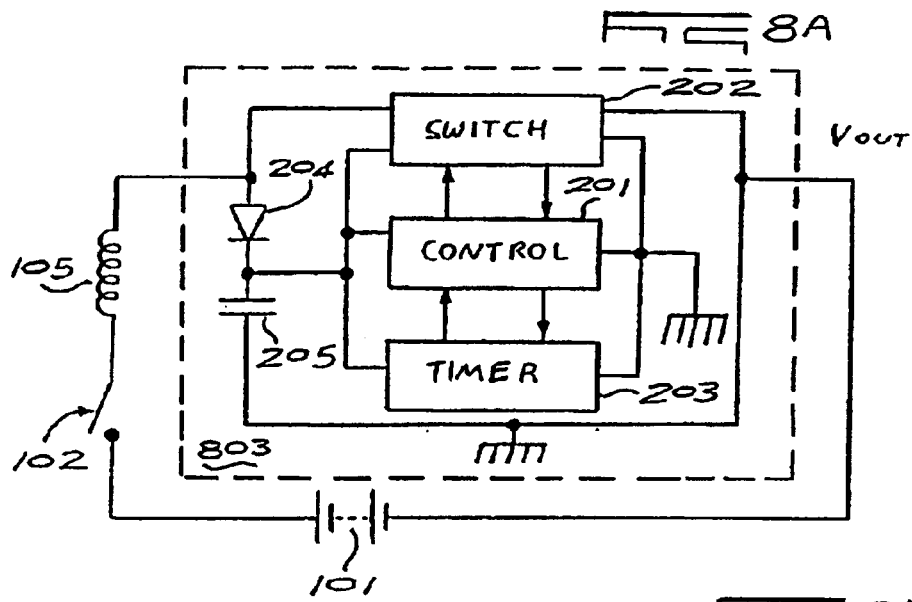
FIG. 8A is a block diagram of a microchip for use in a battery according to one embodiment of the present invention.
Figure 8B:
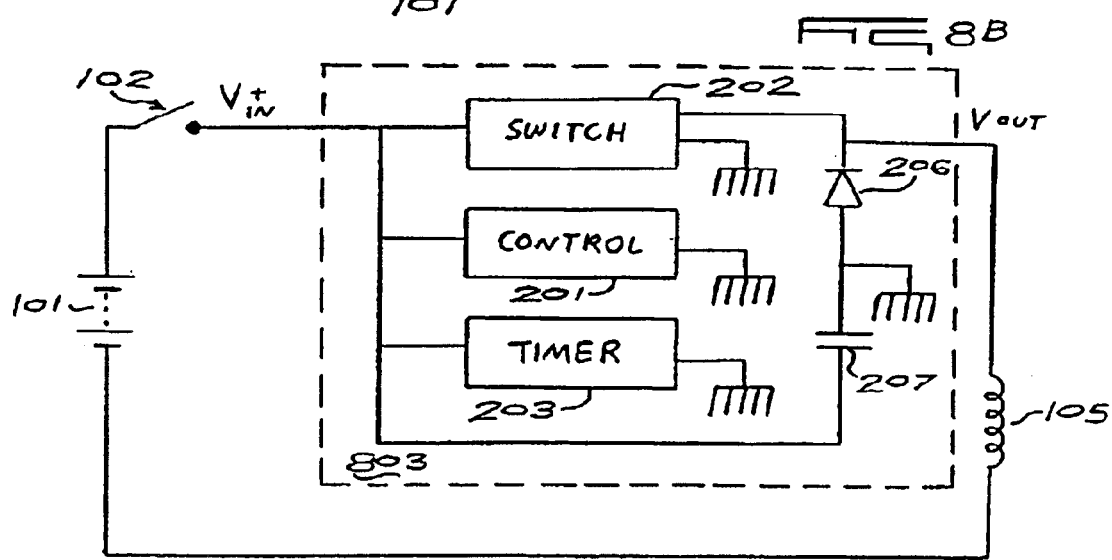
FIG. 8B is a block diagram of a second type of microchip for use in a battery according to another embodiment of the present invention.

FIGS. 8A and 8B are block diagrams of two different further embodiments of the present invention. Microchip 803 is especially suitable for applications wherein microchip 803 is not grounded through the body of the electrical device or where a ground cannot otherwise be established because of design considerations. This embodiment is useful to provide sufficient operating power to the microchip and can be achieved by periodically opening and closing current switch 202 when activation input switch 102 is closed. For example, referring to FIG. 8A, when input switch 102 is closed but current switch 202 does not conduct (that is, the switch is open and does not allow current to flow to load 105), then voltage drop over load 105 is zero and in the case of a flashlight, no illumination is provided from the bulb. Instead, the full voltage drop is over current switch 202 and in parallel with the diode 204 and capacitor 205. Once capacitor 205 becomes fully charged, current switch 202 can close and circuit 103 will be powered by capacitor 205. When circuit 803 is adequately powered, it functions in a manner identical to the circuits described previously with respect to the functions provided by control/reset means 201 and timing means 203.

When the charging capacitor 205 starts to become depleted, control/reset means 201 will recognize this state and reopen the current switch 203, thus briefly prohibiting the flow of current to load 105, in order to remove the voltage drop from load 105 and allow capacitor 205 to recharge and begin a new cycle. In a flashlight application, the time period wherein current flow from current switch 202 is discontinued can be such that the dead period of the light is not easily or not at all detectable by the human eye. In the case of a high current usage load, such as a flashlight, it means the ratio of the capacitance of the capacitor having to power the microchip and the current consumption of the microchip, must be such that the capacitor can power the microchip for a long time relative to the charging time (202 open). This will enable the flashlight's "off" time to be short and the "on" time to be long, thus not creating a detectable or intrusive switching of the flashlight to the user.

Figure 11:
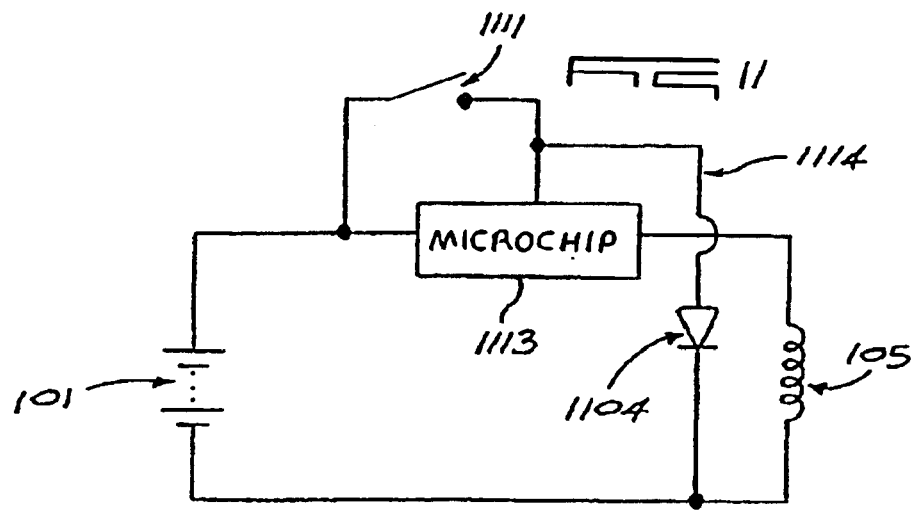
FIG. 11 is a schematic of a device having a microchip controlled switch according to one embodiment of the present invention.

According to another embodiment of the present invention, e.g. in relation to another product of low current consumption, such as a FM radio, the designer may opt for a capacitive (reservoir) device externally to the microchip (see FIG. 11). In this case, the electrical device may function for a time longer than the time required for charging the capacitor (205, 207) which is when the current switch (202) is open and not conducting current.

According to another embodiment of the present invention, an output may be provided to indicate a condition, e.g. a battery is in good or bad condition. It may also be suitable to assist in locating a device, e.g. but not limited to a flashlight, in the dark. This may be a separate output pin or may be, according to another embodiment, shared with the MMI switch input. (See FIG. 11) This output or indicator may be a LED. Referring to FIG. 11, indicator/output device 1104 may, for example, be an LED. When microchip 1113 pulls the line 1114 to high, the LED 1104 shines. LED 1104 may also shine when switch 1111 is closed by the user. However, since that is only a momentary closure, this should not create a problem.

According to a further specific embodiment of the invention, referring to FIG. 11, microchip 1113 can activate the LED 1104 for a short time, e.g. every 100 milliseconds, every 10 seconds. This indication will let potential users know the device is in a good state of functionality and will enable fast location of the device in the dark, e.g. in times of emergency. The low duty cycle will also prevent unnecessary battery depletion.

With an alternative embodiment of the present invention, FIG. 8B illustrates the charging and discharging of capacitor 207 to provide power to circuit 803, wherein the diode and capacitor structure establishes a ground reference for circuit 803.

Each of the embodiments explained with respect to FIGS. 8A and 8B are suitable for use, according to the present invention, depending upon the application. Indeed, the embodiments shown in FIGS. 8A and 8B can be directly embedded into a battery and/or can be separately constructed in another portable structure, e.g. but not limited to, in the shape of a disc, about the size of a quarter, to be inserted at the end of the battery between the output means or positive terminal of the battery and the current receiving structure of the electronic device. As described, the embodiments shown in FIGS. 8A and 8B can be utilized with the prior art high current switches currently being utilized in simple non-intelligent electronic devices, for example flashlights, radios and toys. For example, in the case of a portable simple radio without any intelligence, an automatic shut "off" may be achieved by using the intelligent battery or portable microchip of the present invention having a timing function to automatically shut off the radio after a given period of time, i.e. after the user is asleep.

The architecture of the two embodiments of the present invention shown in FIGS. 8A and 8B provide certain advantages over the simple dumb architecture in current simple electrical devices, for example, flashlights. Due to the unique design of the microchips, as shown in FIGS. 8A and 8B, after the device (into which the microchip is incorporated) is shut off the microchip remains powered for an additional period of time which allows for said microchip to thus receive additional commands, for example, a second "on" activation within a given period after a first "on" and "off" activation, may be programmed into the microchip (control/reset means) to indicate a power reduction or dimming function or any other function as desired by the designer of said device. This is accomplished by the inventive designs of the present invention without having to utilize substantial energy from what are typically small exhaustible power sources, e.g. DC batteries in the case of flashlights.

According to some embodiments of the present invention, more intelligent devices include many other useful functions pre-programmed within the microchip, e.g. in control/reset means 201 and may, e.g. be assisted by a timing means 203. Referring to FIG. 2, commands can be entered through switch 102 in several different ways. First, various time sequences of closed and open activations may represent different commands. For example, but not limited to, a single closure may instruct microchip 103 to activate current switch 202 continuously for a pre-determined length of time. Alternatively, two successive closures may instruct the microchip 103 to intermittently activate current switch 202 for a pre-determined length of time and sequence, for example, a S.O.S. sequence.

Figure 9:
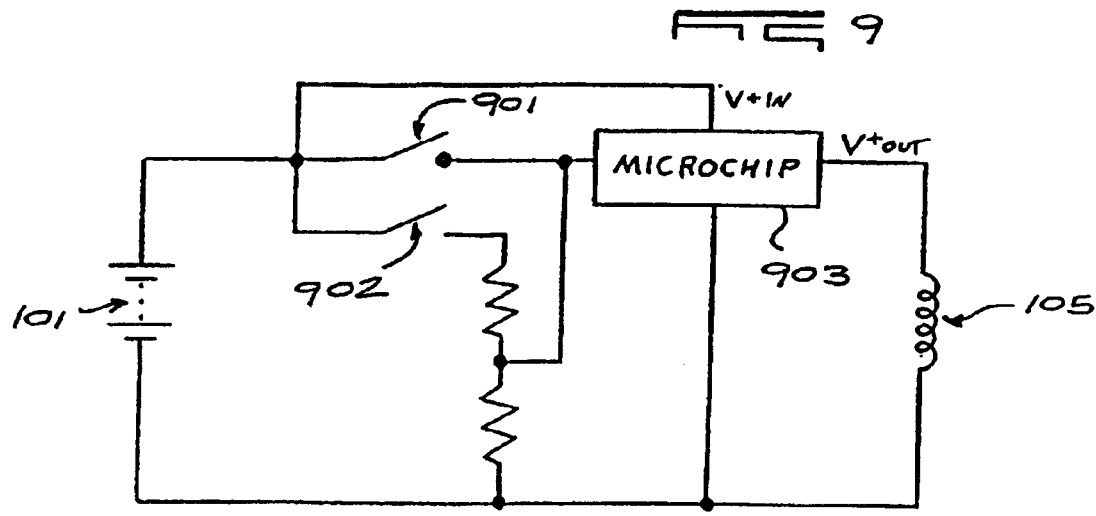
FIG. 9 is a schematic of a device having a microchip controlled switch according to one embodiment of the invention.

Secondly, referring to FIG. 9, commands may be communicated to microchip 903 through the use of various voltages recognizable by microchip 903 to represent various commands. For example, but not limited to, according to one embodiment of the present invention, it may include multiple activating switches 901 and 902 connecting different voltages to the command input structure of microchip 903.

Figure 10:
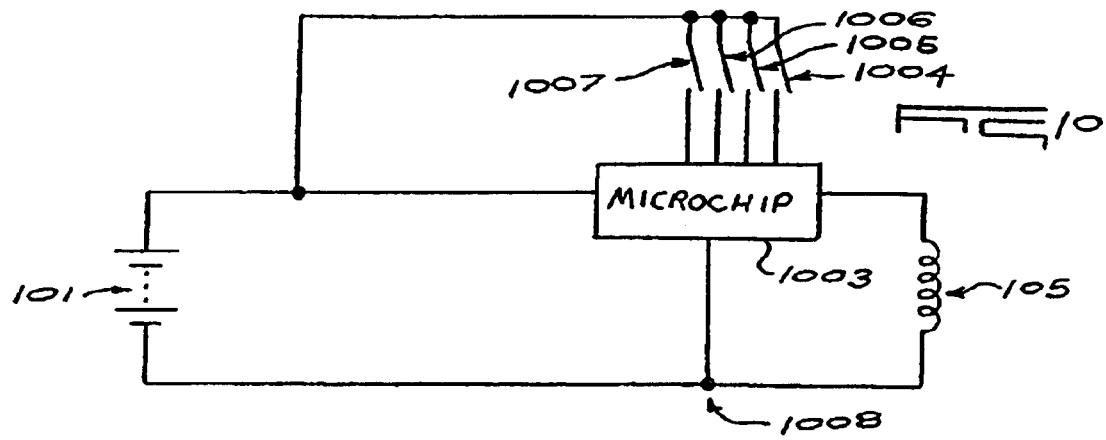
FIG. 10 is a schematic of a device having a microchip controlled switch according to one embodiment of the invention.

Thirdly, referring to FIG. 10, commands may be communicated to microchip 1103 through the use of multiple specific switches (1004, 1005, 1006, 1007) which when activated either singularly or in combination is/are recognizable by microchip 1103 as representing various different commands.

As can be seen by FIG. 9, switch 901 and 902 and in FIG. 10, switches 1004, 1005, 1006, and 1007, power or ground may be used as a command reference voltage level. For example, the switches in FIG. 10 may be connected to another ground instead of point 1008 depending on the internal structure of the microchip.

The control/reset means included in the inventive microchips of the present invention may and in some instances, depending upon the application, should in addition to the many possible user functions described above, include means for adjusting the average current over a switch and/or a means for providing a gradual "on"/"off" current flow, so that the operator does not appreciably perceive the increase and decrease in light provided by the device. These features allow for an ongoing variable level of lighting as desired by an operator, and may also lengthen the life span of the activation switch, the bulb, and the power source. Moreover, several functions can now be added to an existing device, like a flashlight, through the use of a battery having embedded therein a microchip according to the present invention.

In another embodiment of the invention, the microchip is adapted to control lighting in buildings. The normal switch on the wall that currently functions as both a power-switch and MMI can be replaced by a low current switching device like a membrane switch, touch pad or carbon coated switching device. Since very low currents are required by the MMI switch (device) that replaces the normal wall mounted (A/C) switch, it is possible to replace the normal high voltage/current (dangerous) wiring to the switch and from the switch to the lead (light), with connectivity means suitable to the new low current DC requirements. As such, in the case of normal A/C wiring (110V/220V), the dangerous wiring can now be restricted to the roof or ceiling and all switches (MMI's) can inherently be safe. This may make the expensive and regulated safety piping required for the wiring of electricity to wall switches redundant.

In a specific embodiment, the traditional wiring between the light and the wall switch is replaced by flexible current conducting tape that can be taped from the roof and down the wall to the required location. In another embodiment, the connections can be made by current conducting paint or similar substances. In both cases above, it can be painted over with normal paint to conceal it. This makes changing the location of a wall switch or the addition of another switch very easy.

The microchip according to the present invention can be located in the power fitting of the light. The microchip having the low current (MMI) input and a power switch to block or transfer the energy to the load (light, fan, air conditioner). It reacts to the inputs received to activate or disable, or control other functions, of whatever device it is controlling.

The microchip may be adapted to contain the high current/voltage switch or control an external switching device or relay. The microchip may also, as in the other embodiments discussed, have some intelligence to control functions like dimming, delayed shut off, timed activation/deactivation, timed cycles, flashing sequences and gradual on/off switching. The microchip may also be adopted, as in a specific flashlight embodiment discussed, to provide a location/emergency signal for lighting/flashing an LED.

The power input 101 in FIG. 14 may be DC (eg 12V) as is commonly used for some lights or A/C (110V or 240V). The device shown as 1403 may be monolithic or be a multichip unit having a relay (solid state or mechanical), a regulator (eg: 110 AC volt to 12V DC) and a microchip as discussed in this application.

In a specific embodiment, Ic pin 1406 can normally be high and a closure of input means 1402, e.g. any of the low current switching devices described above, can be detected as Ic pin 1405 also goes too high. To flash the LED 1404 the microchip will reverse the polarities so that Ic pin 1405 becomes high with regards to Ic pin 1406. During this time, it may not be possible to monitor the closure of the input 1402 switch and the LED 1404 may not shine should the input 1402 be closed. In another embodiment, microchip 1403 is able to detect closure of input 1402 before reversing the voltage polarity as discussed and if it detects closure, it does not proceed with reversing the polarity.

In FIG. 15, microchip 1503 does not contain a current switch (eg switch 102) as shown in FIG. 2. However, if desired the regulator and relay can be integrated into a single monolithic microchip 1503. In case of a 12V (DC) local voltage this may be done in any event unless the current/power considerations is too high to make it practical.

In another embodiment, the microchips 1403 and 1503 are adapted to receive commands not only via the MMI input but also over the load power (electricity) wiring. This would allow a central controller to send out various commands to various power points, controlled by a microchip according to this invention, by using address information of specific microchips or using global (to all) commands.

While the preferred embodiments of the present invention have been described in detail, it will be appreciated by those of ordinary skill in the art that changes and modifications may be made to said embodiments without, however, departing from the spirit and scope of the present invention as claimed.

What is claimed is:

1. A system for use with an exhaustible power source and an energy consuming light generating load, said system comprising:
   (a) a microchip having at least a first input, said first input transfers information to said microchip when a switch connected to said first input has been activated or deactivated, and when in use with said power source and said load, said input and said switch do not form a serial link in a circuit that conducts energy from the power source to activate the light generating load and wherein said switch is a user interface;
   (b) said microchip being configured to control the activation and deactivation of the energy flow from said power source to said light generating load in response to at least a signal received through said first input;
   (c) said microchip also configured to control the selection of one of a plurality of operating modes, including at least the adjustment in the power supplied to the load, in response to at least a signal received through said first input such that at least two levels of illumination can be activated; and
   (d) said microchip further configured to control at least one function selected from the group consisting of:
     (i) a low energy consuming find-in-the-dark location indicator that is active when the load is not activated by the user and when the power source is not being charged, said indicator also gives an indication of the said switch operations;
     (ii) a power source level indicator that is not dependent on user selection and/or light generating load activation, and is active when the power source is not being charged; and
     (iii) a gradual adjustment of power to the load, such that the gradual change in power is not easily visible to the human eye, and wherein the adjusted power level is based on operator actions.

2. The system of claim 1, comprising a single switch connected to a single input of said microchip, wherein said switch is the only interface switch.

3. The system of claim 1, wherein the microchip controls at least two functions selected from the group in (d).

4. The system of claim 3, comprising a single switch connected to a single input of said microchip, wherein said switch is the only user activation and deactivation interface switch.

5. The system of claim 1, wherein a further function controlled by the microchip comprises at least one function selected from the group consisting of a find-in-the-dark indicator also giving an indication of the remaining power in the power source, providing a gradual increasing power adjustment function when switched on and providing a gradual power reduction function when switched off.

6. The system of claim 2, wherein a further function controlled by the microchip comprises at least one function selected from the group consisting of a find-in-the-dark-indicator also giving an indication of the remaining power in the power source, providing a gradual increasing power adjustment function when switched on and providing a gradual power reduction function when switched off.

7. The system of claim 1 wherein the microchip is further configured to recognize the selection by the user of specifically the deactivation of the load or off function, by the time duration of switch activation, the time duration of switch deactivation, and the number of activation signals received through said first input.

8. The system of claim 4 wherein the microchip is further configured to recognize the selection by the user of specifically the deactivation of the load or off function, by the time duration of the switch deactivation, and the number of activation signals received through said first input.

9. The system of claim 2 wherein the microchip is configured to control a flashing function on said load in response to the time period of an activation of the switch being longer than a predefined period.

10. The system of claim 1 wherein said microchip is always powered when a power source is connected in the system.

11. The system of claim 3 wherein a further function controlled by the microchip comprises at least one function selected from the group consisting of a find in the dark indicator also giving an indication of the remaining power in the power source, providing a gradual increasing power adjustment function when switched on, providing a gradual power reduction function when switched off and an automatic delayed shut-off function in response to an activation signal received through said input.

12. The system of claim 11 wherein the microchip recognizes the selection by the user of specifically the switch off function by the time duration of the switch being activated, the time duration of switch being deactivated, and the number of activation signals, received through said first input.

13. A system for use with an exhaustible power source and an energy consuming light generating load, said system comprising:
(a) a microchip having at least a first input, said first input transfers information to said microchip when an switch connected to said first input has been activated or deactivated, and when in use with said power source and said load, said input and said switch do not form a serial link in the circuit that conducts energy from the power source to energize the light generating load and said at least one switch being a user interface;
(b) said microchip configured to control the activation and deactivation of the energy flow from said power source to said light generating load in response to at least a signal received through said first input;
(c) said microchip also configured to control the selection of one of a plurality of operating modes, including at least the adjustment in the power supplied to the light generating load to provide a different level of illumination, in response to at least a signal received through said first input; and
(d) said microchip further configured to control at least an automatic delayed shut off function in response to an activation signal received through said first input.

14. The system of claim 13 wherein the switch is the only user interface switch.

15. A system for use with an exhaustible power source and an energy consuming light generating load, said system comprising:
(a) a microchip having at least a first input, said first input transfers information to said microchip when an switch connected to said first input has been activated or deactivated, and when in use with said power source and said load, said input and said switch do not form a serial link in the circuit that conducts energy from the power source to energize the load;
(b) said microchip configured to control the activation and deactivation of the energy flow from said power source to said light generating load in response to at least a signal received through said first input;
(c) said microchip also configured to control the selection of one of a plurality of operating modes, including at least the adjustment in the power supplied to the light generating load to achieve an adjusted illumination level, in response to at least a signal received through said first input; and
(d) said microchip further configured to control at least a find-in-the-dark location indicator that is active when the light generating load is not activated by the user and when the power source is not being charged, said indicator also gives an indication of the said switch operations.

16. A system for use with an exhaustible power and an energy consuming light generating load, said system comprising:
(a) a microchip having at least a first input, said first input transfers information to said microchip when an switch connected to said first input has been activated or deactivated, and when in use with said power source and said light generating load, said input and said switch do not form a serial link in the circuit that conducts energy from the power source to energize the light generating load;
(b) said microchip configured to control the activation and deactivation of the energy flow from said power source to said light generating load in response to at least a signal received through said first input;
(c) said microchip also configured to control the selection of one of a plurality of operating modes, including at least the adjustment in the power supplied to the light generating load to achieve an adjusted illumination level, in response to at least a signal received through said first input; and
(d) said microchip further configured to control at least said microchip further configured to control at least a power source level indicator that (i) is active when the light generating load is not activated, and/or (ii) is not dependent on user selection, and (iii) is active when the power source is not being charged.

17. A system for use with an exhaustible power source and an energy consuming light generating load, said system comprising:
(a) a microchip having at least a first input, said first input transfers information to said microchip when a switch connected to said first input has been activated or deactivated, and when in use with said power source and said load, said input and said switch do not form a serial link in the circuit that conducts energy from the power source to energize the light generating load;

(b) said microchip configured to control the activation and deactivation of the energy flow from said power source to said light generating load in response to at least a signal received through said first input;

(c) said microchip also configured to control the selection of one of a plurality of operating modes, including at least the adjustment in the power supplied to the light generating load to achieve an adjusted illumination level, in response to at least a signal received through said first input; and (d) said microchip further configured to control at least a gradual adjustment of power to the load, such that the gradual change in power is not easily visible to the human eye, and wherein the adjusted power level is based on the time of switch closed and/or open operations.

18. A system for use with an exhaustible power source and an energy consuming light generating load, said system comprising:

(a) a microchip having at least a first input, said first input transfers information to said microchip when a switch connected to said first input has been activated or deactivated, and when in use with said power source and said load, said input and said switch do not form a serial link in the circuit that transfers the energy between the power source and the load;

(b) said microchip configured to control the activation and deactivation of the energy flow from said power source to said light generating load in response to at least a signal received through said first input;

(c) said microchip also configured to control the selection of one of a plurality of operating modes, including at least the adjustment in the power supplied to the light generating load to achieve an adjusted illumination level, in response to at least a signal received through said first input; and (d) said microchip further configured to control the selection of a specific function by a user being dependent on the time duration of the switch being activated, the time duration of the switch being deactivated, and the number of activation signals received from the switch through said first input.

19. The system of claim 18 wherein the microchip controls an adjustment in power supplied to the light generating load through an intermittent power sequence such that any period wherein the power source is not connected to the light source, does not create an easily visible dead period.

20. The system of claim 13 wherein the microchip is always powered if a good power source is connected in the system.

21. The system of claim 17 wherein the microchip also controls a delayed shut off function in response to an activation command received through said first input.

22. The system of claim 19 wherein the microchip also controls a delayed shut off function in response to an activation command received through said first input.

23. The system of claim 15 wherein the microchip also controls a power source level indicator that is not activated by the user.

24. The system of claim 17 wherein the microchip also controls a visual find-in-the-dark indicator that is active when the light generating load is not activated by the user.

25. The system of claim 19 wherein the microchip also controls a visual find-in-the-dark indicator that is not activated by the user.

26. The system of claim 19 wherein the microchip also controls the indication of the power source level that is not selected by the user.

27. The system of claim 18 wherein the microchip also controls a gradual adjustment of the power supplied to the light generating load in response to a signal received through said first input such that the gradual change of power is not easily visible to the user.

28. The system of claim 4 wherein a further function controlled by said microchip is an automatic delayed shut off function.

29. The system of claim 28 wherein the microchip further controls a find-in-the-dark indicator when the light source is switched off.

30. The system of claim 1 wherein the off mode is selected upon receiving a signal indicating the deactivation of the switch, if the preceding period of the switch activation was longer than a certain minimum period.

31. The system of claim 1 wherein the microchip also controls a gradual increase in power to the load when switching "on" and/or a gradual reduction in power to the load when switching "off", such that the gradual change in the power supplied to the light generating load is not easily visible to the user.

32. The system of claim 4 wherein the system is adapted for use in a flashlight.

33. The system of claim 21 comprising a casing and wherein the microchip, the light generating load and the switch are each attached to and/or enclosed in the casing.

34. The system of claim 22 comprising a casing and wherein the microchip, the light generating load and the switch are each attached to and/or enclosed in the casing.

35. The system of claim 27 comprising a casing and wherein the microchip, the light generating load and the switch are each attached to and/or enclosed in the casing.

36. The system of claim 2 wherein a further function controlled by said microchip is an automatic delayed shut off function in response to an activation signal received at least through said first input.

37. The system of claim 17 wherein a further function controlled by said microchip is an automatic delayed shut off function.

38. The system of claim 1 wherein said system controls all three functions from said group in (d).

39. The system of claim 1 wherein the system is adapted for use in a portable lighting product and wherein the said microchip is also configured to control the giving of an indication of the remaining power in said power source when the light generating load is deactivated by the user.

40. The system of claim 38 wherein the system is adapted for use in a portable lighting product and the microchip is further configured to control the giving of an indication of the remaining power in said power source.

41. The system of claim 1 wherein the microchip is further configured to accept commands that contain at least an address from another controller.

42. The system of claim 37 further comprising a casing and wherein the said microchip, said switch and said light generating load are each attached to and/or enclosed in the casing.

43. The system of claim 17 wherein the microchip is further configured to accept commands that contain at least an address from another controller.

44. The system of claim 37 wherein the microchip is further configured to accept commands that contain at least an address from another controller.

45. The system of claim 42 wherein the microchip is further configured to accept commands that contain at least an address from another controller.

46. The system of claim 44 wherein said commands are transferred via a power line to the microchip.

47. The system of claim 45 wherein said commands are transferred via a power line to the microchip.

48. The system of claim 1 in a configuration wherein the system further comprises an energy storage device that supplies energy to said microchip when said power switch is conducting, and wherein when said power switch is not conducting, said storage device is recharged from said power source.

49. The system of claim 3 in a configuration wherein the system further comprises an energy storage device that is required to supply energy to said microchip when said power switch is conducting, and wherein when said power switch is not conducting, said storage device is recharged from said power source.

50. The system of claim 1 wherein a switch connected to an input is a touch pad or a touch sensor.

51. The system of claim 1 wherein the switch connected to said first input is a touch pad or a touch sensor.

52. The system of claim 13 wherein a switch connected to an input is a touch pad or a touch sensor.

53. The system of claim 13 wherein the switch connected to said first input is a touch pad or a touch sensor.

54. The system of claim 18 wherein the switch connected to said first input is a touch pad or a touch sensor.

55. The system of claim 21 wherein the switch connected to said first input is a touch pad or a touch sensor.

56. The system of claim 22 wherein the switch connected to said first input is a touch pad or a touch sensor.

* * * * *